May 3, 1966 A. E. BAAK 3,249,721
HEATING AND COOLING THERMOSTAT
Filed Aug. 9, 1963 2 Sheets-Sheet 1
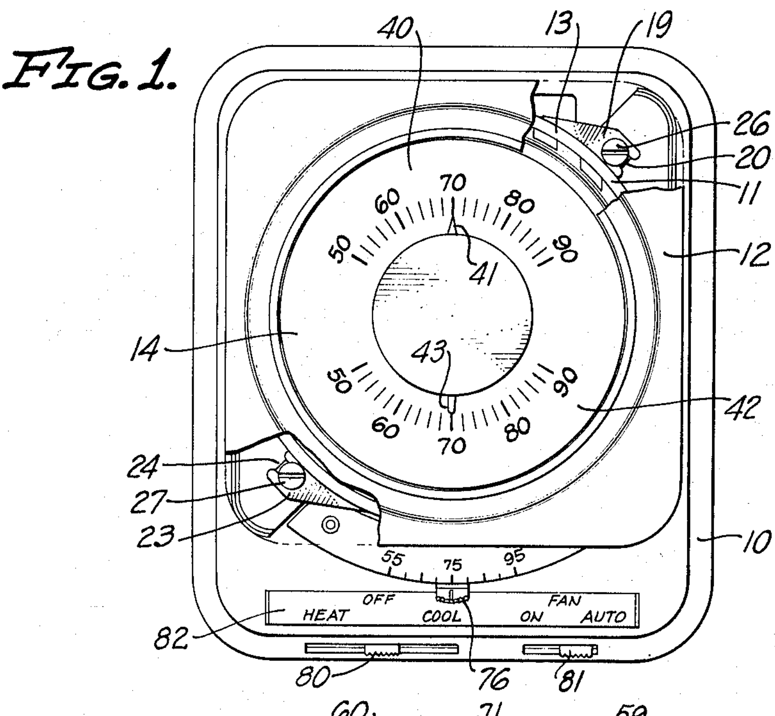
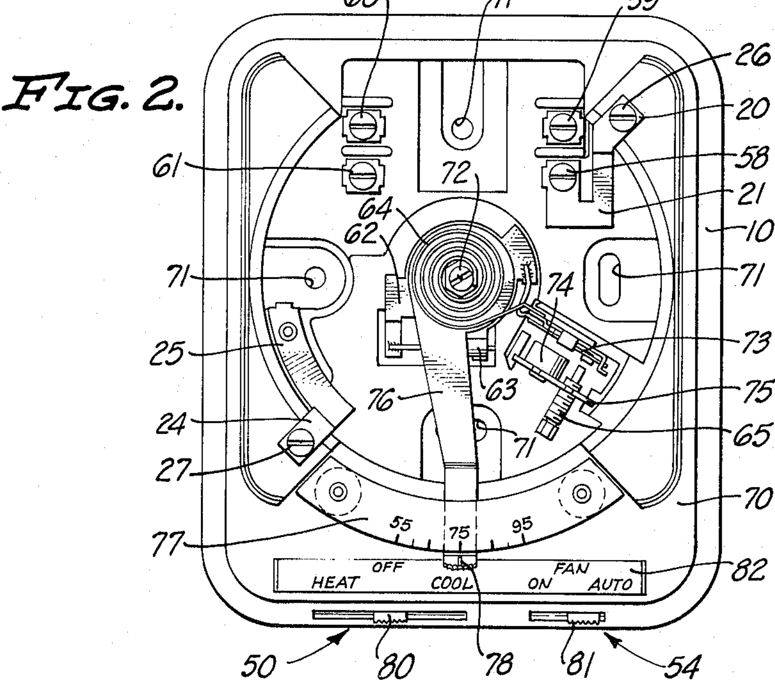
INVENTOR.
ALBERT E. BAAK
BY HIS ATTORNEYS
HARRIS, KIECH, RUSSELL & KERN May 3, 1966 A. E. BAAK 3,249,721
HEATING AND COOLING THERMOSTAT
Filed Aug. 9, 1963 2 Sheets-Sheet 2
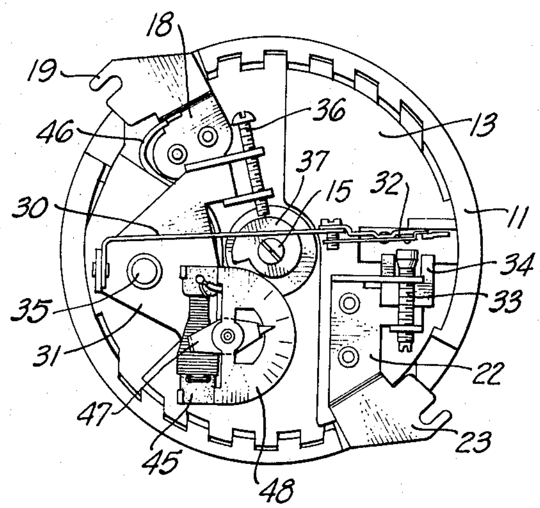
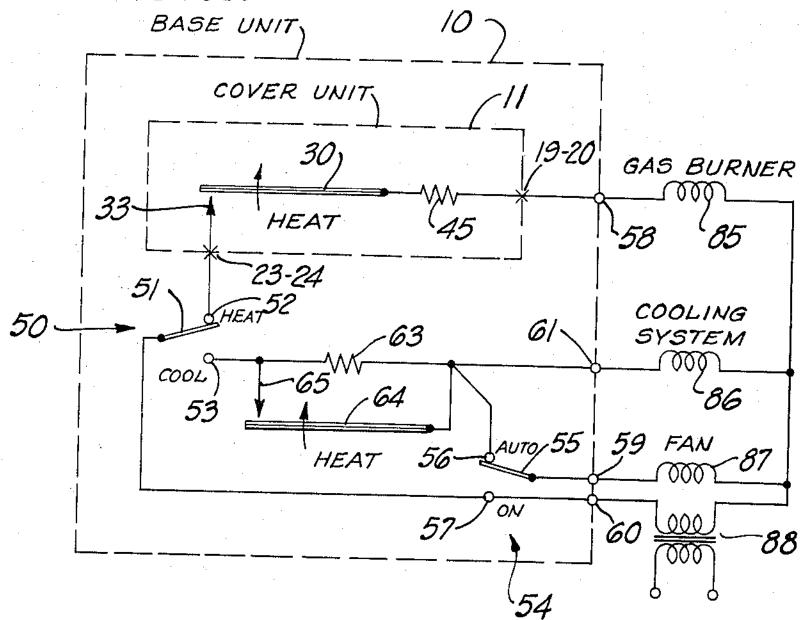
INVENTOR.
ALBERT E. BAAK
BY HIS ATTORNEYS
HARRIS, KIECH, RUSSELL & KERN United States Patent Office 3,249,721

Patented May 3, 1966

1

3,249,721

HEATING AND COOLING THERMOSTAT

Albert E. Baak, 640 Ocampo Drive, Pacific Palisades, Calif.

Filed Aug. 9, 1963, Ser. No. 301,145
2 Claims. (Cl. 200—122)

This invention relates to a combination heating and cooling thermostat control for temperature control of residences, offices and the like.

Modern residences and offices now have both heating systems and cooling systems, many of which utilize the same ducts and blowers for both systems. While both systems ordinarily are not operated at the same time, it is desirable to provide control of the heating and cooling systems from a single point. Conventional thermostat units ordinarily utilize a single temperature sensitive element with appropriate switching circuitry providing for selective operation of the heating system and the cooling system. Problems are encountered in the design and operation of such thermostat units as the desirable control characteristics of the two systems are in some respects incompatible.

It is an object of the present invention to provide a new and novel thermostat control incorporating separate temperature sensitive elements for the heating system and the cooling system. A further object is to provide such a thermostat unit incorporating independent anticipator resistors for each of the temperature sensitive elements. An additional object is to provide such a thermostat unit having selector switches and temperature setting mechanisms so that the occupant may independently set the operating temperature for the heating and the cooling systems and select one or the other for operation as desired.

It is a particular object of the invention to provide a heating and cooling thermostat for selectively actuating heating and cooling system electrical control coils and including a base unit for attachment to a mounting surface, a first temperature sensitive element mounted in the base unit for opening and closing a first contact set as a function of temperature, a power direction switch in the base unit and connected between a power terminal and first and second output terminals, first circuit means in the base for connecting the first contact set between the first output terminal and a cooling coil terminal, a cover unit removably mounted on the base unit at a pair of circuit closing lugs, a second temperature sensitive element mounted in the cover unit for opening and closing a second contact set as a function of temperature, second circuit means in the cover unit for connecting the second contact set in series with the lugs, and third circuit means in the base unit for connecting the lugs between the second output terminal and a heating coil terminal.

It is a further object of the invention to provide such a thermostat including a cooling anticipator resistor mounted in thermal contact with the first temperature sensitive element and connected in parallel with the first contact set, and a heating anticipator resistor mounted in thermal contact with the second temperature sensitive element and connected in series with the second contact set.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 1 is a front view of a preferred form of the thermostat with portions of the outer shroud broken away;

2

FIG. 2 is a view of the thermostat of FIG. 1 with the cover unit removed showing the interior of the base unit;

FIG. 3 is a view of the back side of the cover unit; and

FIG. 4 is an electrical diagram of the thermostat of FIG. 1.

The thermostat includes a base unit 10, a cover unit 11 mounted on the base unit, and an outer cover or shroud 12 carried on the cover unit. The shroud typically is molded of opaque plastic and is a push fit on the cover unit and serves to enclose the working elements of the thermostat.

The cover unit 11 includes a housing 13, typically molded of opaque plastic, and a transparent face 14 rotatably mounted in the housing on a shaft 15 (FIGS. 1 and 3). A metal plate 18 is fixed in the housing 13 and terminates at one end in a lug 19 which engages a mating lug 20 of a plate 21 in the base unit 10. Another plate 22 in the housing 13 of the cover unit terminates in a lug 23 which engages a mating lug 24 of a plate 25 of the base unit. The mating sets of lugs may be clamped together by screws 26, 27 for holding the cover unit to the base unit.

A temperature sensitive element 30 in the form of a bimetallic strip is fixed at one end to a plate 31 and carries a spring contact 32 at the other end for engaging a contact screw 33 mounted in the plate 22. A permanent magnet 34 may be positioned adjacent the moving end of the temperature sensitive element for providing a snap action in the opening and closing of the contact set.

The plate 31 is pivotally mounted on a post 35 and includes a screw 36 riding on a cam 37 carried on the shaft 15. Manual rotation of the face plate 14 provides a corresponding movement of the plate 31 and the fixed end of the bimetal 30 for adjustment of the particular temperatures at which the contact set is opened and closed. Referring to FIG. 1, a temperature scale 40 is provided on the front surface of the housing 13 and a pointer 41 is carried by the face 14 to provide an indication of the temperature setting of the unit. A thermometer may also be built into the cover unit and comprises a temperature scale 42 and a pointer 43.

Referring again to the interior of the cover unit as shown in FIG. 3, an adjustable resistor 45 is mounted directly on the plate 31 with one end electrically connected to the plate 18 by a wire 46. Electrical contact is made between the plate 31 and the resistor 45 via a pivoting contact arm 47 carried in an indicator bracket 48 which is an integral part of the plate 31.

A three-position switch 50 is mounted in the base unit 10 and has a moving arm 51, a heat terminal 52, and a cool terminal 53, with the moving arm also being positionable between the heat and cool terminals to provide an off position. The complete electrical circuit is shown in FIG. 4. A two-position switch 54 is also mounted in the base unit and includes a moving arm 55, an auto terminal 56, and an on terminal 57. Plate 25 carrying lug 24 is directly connected to the heat terminal 52. Plate 21 carrying lug 20 has a wire terminal 58 at the other end thereof. A wire terminal 59 is connected to the moving arm 55 of the switch 54. A wire terminal 60 is connected to the on terminal 57 of the switch 54 and to the moving arm 51 of the switch 50. Wire terminal 61 is connected to a plate 62 which in turn is connected to one terminal of a resistor 63, to a temperature sensitive element in the form of a bimetallic coil 64, and to the auto terminal 56 of the switch 54. The other end of the resistor 63 and a contact screw 65 are connected to the cool terminal 53 of the switch 50.

The switches, the plates and the wire terminals of the base unit are carried in a housing 70, typically a plastic molding having openings 71 for mounting the unit on a suitable surface, such as the wall of a room (FIG. 2).

A shaft 72 is pivotally mounted in the plate 62 in the base unit and one end of the bimetal coil is fixed to the shaft. A contact 73 is carried at the other end of the bimetal 64 for engaging the contact screw 65. A permanent magnet 74 may be mounted on the bracket 75 with the screw 65 to improve the snap action opening and closing of the contact set. A lever 76 is carried on the shaft 72 and provides for manual movement of one end of the bimetal 64 to adjust the temperatures at which the contact set opens and closes. A temperature scale 77 is carried at the lower end of the base unit for use in conjunction with an index mark 78 at the outer end of the lever 76.

The resistor 63 is physically mounted in a bracket formed in the plate 62 providing thermal contact between the resistor and the plate. The moving arm 51 of the switch 50 has an actuating lever 80 projecting from the bottom of the housing unit and the moving arm 55 of the switch 54 has a similar actuating lever 81. A panel 82 carried on the housing unit provides a visual indication of the position of the switches.

The thermostat unit may be installed in any convenient location by attaching the base unit 10 to the mounting surface with one or more screws through the openings 71. The wiring from the devices to be controlled is then connected to the terminals 58–61, after which the cover unit is attached to the base unit by engaging the lugs 19, 20 and 23, 24. The screws 26, 27 are tightened in place and the shroud 12 is pushed into place on the cover unit. The thermostat is now ready for operation.

The external electrical connections for the thermostat are shown in FIG. 4. Terminal 58 is connected to the heating system, typically to the solenoid coil 85 of a gas burner. Terminal 61 is connected to the cooling system, typically to the solenoid coil 86 of a relay for energizing the air conditioning unit. Terminal 59 is connected to the fan or blower, typically to the solenoid coil 87 of the fan control relay, for forced circulation of the heated or cooled air. It should be noted that in some installations, blowers will not be used or will be controlled by other means and the switch 54 and terminal 59 may be omitted. The terminal 60 is connected to one side of the secondary winding of a transformer 88 with the other side of the secondary winding connected to each of the solenoids 85, 86, 87. Typically the transformer 88 will have a 115 volt input and a 24 volt output providing a low voltage control system for the heating and cooling equipment.

The thermostat may be used to control a heating system by moving the switch 50 to the heat position and to control a cooling system by moving the switch to the cool position. With the switch 50 in the heat position, the power source from the transformer 88 is connected in series through the switch 51, the contact set of the temperature sensitive element 30, the resistor 45, and the burner solenoid 85. When the ambient air temperature falls below the desired temperature, the free end of the bimetal 30 moves clockwise as seen in FIG. 3 or counterclockwise as seen in FIG. 4 to close the contacts 32, 33 and energize the burner solenoid. The room temperature rises as a result of operation of the heating system, ultimately causing the bimetal to move away from the fixed contact and de-energize the burner solenoid, shutting off the heating system.

It has been found that more precise temperature control may be achieved by operating a low heat source adjacent the temperature sensitive bimetal when the heating system is on. This is accomplished in the thermostat of the invention by connecting the resistor 45 in series with the burner solenoid and positioning the resistor in direct thermal contact with the temperature sensitive element. The additional heat generated by the resistor 45 causes opening of the solenoid power circuit a period of time before the ambient temperature reaches the desired magnitude. This anticipation control tends to prevent the ambient temperature from going higher or overshooting the desired temperature as there is a time lag between shutting down of the gas burner and the termination of delivery of heat to the room by the heating system. The magnitude of resistance of the anticipator resistor 45 is readily determined by experimenting with a particular volume of room and a particular heating system. Means are provided in the thermostat for adjusting the resistance value. The structure illustrated herein where the anticipator heating resistor is placed in direct thermal contact with the bimetal element provides optimum control, making the anticipator heat supply substantially independent of the ambient air temperature.

When it is desired to switch from the heating system to the cooling system, the switch 50 is actuated to connect the transformer power source to the cool contact 53, the parallel combination of the resistor 63 and bimetal 64, and the cooling solenoid 86. The fan or blower may be operated in synchronism with the cooling system by moving the switch 54 to the auto terminal 56. Alternatively, the fan may be operated continuously or under external control by moving the switch 54 to the one terminal 57. When the temperature in the room being cooled rises above the desired value, the free end of the bimetal element 64 moves clockwise as viewed in FIGS. 2 and 4 to close the contacts 73, 65 and shunt the resistor 63. When the resistor 63 is shunted, the cooling solenoid 86 is energized to actuate the cooling system. When the temperature falls to the desired value, the bimetal is moved away from the fixed contact, opening the shunting circuit around the resistor 63. The resultant voltage drop across the resistor 63 is such that the solenoid coil 86 is deenergized, shutting off the cooling system.

The resistor 63 operates as an anticipating heat source in the same manner as the resistor 45 of the cover unit. Optimum operation for the thermostat in controlling the cooling system is achieved by selecting the characteristics of the bimetal 64 and resistor 63 to correspond with the characteristics of the cooling system and the room being cooled. The thermostat of the present invention which provides independent and thermally isolated anticipator resistors for the heating and cooling control circuits permits optimum operation of both heating and cooling systems with a single thermostat. The thermostat of the present invention does the work of both a heating system thermostat and a cooling system thermostat while requiring the installation work and mounting space of only a single instrument, at the same time permitting independent matching of characteristics of the two systems being controlled.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a heating and cooling thermostat for selectively actuating heating and cooling system electrical control coils, the combination of:

a base unit for attachment to a mounting surface and having cooling and heating coil terminals and a first pair of circuit closing lugs;

a first temperature sensitive element mounted in said base unit for opening and closing a first contact set as a function of temperature;

a power direction switch in said base unit and connected between a power terminal and first and second output terminals thereof;

first circuit means in said base unit connected between said first output terminal of said switch and said cooling coil terminal and including a first resistor disposed adjacent said first temperature sensitive element and connected in parallel with said first contact set;

a cover unit having a second pair of circuit closing lugs, with said cover unit removably mounted on said base unit with said pairs of lugs in electrical and mechanical engagement for electrically interconnecting said cover and base units and for supporting said cover unit on said base unit;

a second temperature sensitive element mounted in said cover unit for opening and closing a second contact set as a function of temperature;

second circuit means in said cover unit connected in series with said lugs thereof and including a second resistor disposed adjacent said second temperature sensitive element and connected in series with said second contact set; and third circuit means in said base unit for connecting said lugs thereof between said second output terminal of said switch and a heating coil terminal.

2. A thermostat as defined in claim 1 in which said base unit includes a metal plate mounted therein and a shaft pivotally mounted in said plate and means for manually rotating said shaft relative to said base unit, with said first temperature sensitive element having one end fixed to said shaft with the first contact set adjacent the other end thereof and with said first resistor mounted in thermal contact with said plate.

References Cited by the Examiner

UNITED STATES PATENTS

| | | | |
|---|---|---|---|
| 2,810,045 | 10/1957 | Millerwise | 200—138 |
| 2,953,664 | 9/1960 | Mitick | 200—138 |
| 3,014,704 | 12/1961 | Bierwirth et al. | 200—138 |

BERNARD A. GILHEANY, *Primary Examiner.*

L. A. WRIGHT, *Assistant Examiner.*